US009257799B2

(12) United States Patent
Stubbs et al.

(10) Patent No.: US 9,257,799 B2
(45) Date of Patent: Feb. 9, 2016

(54) VEHICLE ELECTRONIC CONNECTOR HUB (71) Applicant: Ford Global Technologies, LLC, Dearborn, MI (US)

(72) Inventors: Ed Stubbs, London (GB); Andrew John Murray, Colchester (GB); Bruce Southey, Farnham (GB); Alicia Agius, Essex (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/300,759

(22) Filed: Jun. 10, 2014

(65) Prior Publication Data
US 2015/0357768 A1    Dec. 10, 2015

(51) Int. Cl.
*H01R 13/73*    (2006.01)
*B60R 16/02*    (2006.01)

(52) U.S. Cl.
CPC ............... *H01R 13/73* (2013.01); *B60R 16/02* (2013.01)

(58) Field of Classification Search
CPC ........................................ H01R 13/73
USPC .................. 296/24.37, 24.4, 24.34
See application file for complete search history.

(56) References Cited

U.S. PATENT DOCUMENTS

| | | | | | |
|---|---|---|---|---|---|
| 3,622,684 | A | * | 11/1971 | Press ...................... | H02G 3/185 174/484 |
| 3,646,244 | A | * | 2/1972 | Cole ....................... | H02G 3/185 174/483 |
| 3,972,579 | A | * | 8/1976 | Kohaut .................. | H02G 3/185 439/131 |
| 3,992,070 | A | * | 11/1976 | Dunn ..................... | B60K 37/00 292/263 |
| 4,372,629 | A | * | 2/1983 | Propst .................... | A47B 21/06 248/52 |
| 4,984,982 | A | * | 1/1991 | Brownlie ............. | G02B 6/4451 174/490 |
| 5,102,181 | A | * | 4/1992 | Pinkney ................. | B60K 37/00 224/282 |
| 5,122,069 | A | * | 6/1992 | Brownlie ............. | G02B 6/4451 174/53 |
| 5,230,552 | A | * | 7/1993 | Schipper ................ | A47B 21/06 108/26 |
| 5,231,562 | A | * | 7/1993 | Pierce .................... | A47B 21/06 108/50.02 |
| 5,314,103 | A | * | 5/1994 | Li .......................... | B60R 7/084 224/282 |
| 5,342,993 | A | * | 8/1994 | Siems .................... | H02G 3/185 174/481 |
| 5,397,160 | A | * | 3/1995 | Landry ................... | B60R 7/04 224/539 |
| 5,542,589 | A | * | 8/1996 | McKee ................. | B60N 3/001 224/275 |
| 5,551,616 | A | * | 9/1996 | Stitt ....................... | B60R 7/043 220/631 |
| 5,575,668 | A | * | 11/1996 | Timmerman .......... | A47B 21/06 174/482 |
| 5,709,156 | A | * | 1/1998 | Gevaert ................. | A47B 21/06 108/26 |
| 5,980,279 | A | * | 11/1999 | Muller ................... | A47B 21/06 174/489 |

(Continued)

*Primary Examiner* — Ross Gushi
(74) *Attorney, Agent, or Firm* — Vichit Chea; Price Heneveld LLP (57) ABSTRACT

A console assembly includes a console housing with a storage compartment having a member in a wall that is rotatable between a plurality of positions. The member includes an electronic port for connecting an electronic device that is accessible from within the compartment when the member is rotated to a first position and accessible from outside the compartment when the member is rotated to a second position. A second port may be added to the member such that the member can rotate to an intermediate position where one port is accessible from within the compartment while the second port on the member is simultaneously accessible from the outside of the compartment.

20 Claims, 7 Drawing Sheets

(56) References Cited

U.S. PATENT DOCUMENTS

| | | | | |
|---|---|---|---|---|
| 5,996,866 A * | 12/1999 | Susko | B60R 11/0241 | 224/281 |
| 6,028,267 A * | 2/2000 | Byrne | H01R 13/518 | 174/55 |
| 6,046,405 A * | 4/2000 | Obermann | H02G 3/185 | 174/17 CT |
| 6,085,667 A * | 7/2000 | Gevaert | A47B 21/06 | 108/50.02 |
| 6,086,129 A * | 7/2000 | Gray | B60K 37/00 | 296/37.8 |
| 6,127,630 A * | 10/2000 | McKenzie | H02G 3/14 | 174/58 |
| 6,234,812 B1 * | 5/2001 | Ivers | A47B 21/06 | 362/127 |
| 6,273,310 B1 * | 8/2001 | Gregory | B60R 7/04 | 108/44 |
| 6,290,518 B1 * | 9/2001 | Byrne | H02G 3/185 | 16/224 |
| 6,435,729 B1 * | 8/2002 | Thevenod | A47B 21/06 | 385/134 |
| 6,588,821 B2 * | 7/2003 | Worrell | B60N 2/26 | 224/275 |
| 6,616,205 B2 * | 9/2003 | Bruhnke | B60R 7/04 | 224/275 |
| 6,726,267 B2 * | 4/2004 | Kim | B60R 7/04 | 296/24.34 |
| 6,851,736 B1 * | 2/2005 | Klopp, III | B60R 7/04 | 224/926 |
| 6,942,502 B2 * | 9/2005 | Sharples | H01R 13/44 | 174/480 |
| 6,979,209 B2 * | 12/2005 | Griepentrog | H01R 13/447 | 174/57 |
| 7,109,417 B1 * | 9/2006 | Beam | H04R 27/00 | 174/560 |
| 7,111,883 B1 * | 9/2006 | Patel | B60R 7/04 | 296/24.34 |
| 7,163,409 B1 * | 1/2007 | Chen | H01R 25/006 | 439/131 |
| 7,175,217 B1 * | 2/2007 | Lota | B60R 13/02 | 296/1.07 |
| 7,198,512 B1 * | 4/2007 | Swiatek | B62J 9/008 | 224/902 |
| 7,285,733 B2 * | 10/2007 | Bowman | H02G 3/185 | 174/480 |
| 7,296,775 B2 * | 11/2007 | Mayer | H01R 25/006 | 211/163 |
| 7,407,392 B2 * | 8/2008 | Cooke | A47B 21/06 | 108/62 |
| 7,413,229 B2 * | 8/2008 | Kukucka | B60N 2/4646 | 296/1.09 |
| 7,469,951 B2 * | 12/2008 | Welschholz | B60R 7/06 | 296/37.12 |
| 7,513,007 B2 * | 4/2009 | Chernoff | A47L 5/24 | 15/313 |
| 7,533,918 B2 | 5/2009 | Spykerman et al. | | |
| 7,605,330 B1 * | 10/2009 | Black | H02G 3/185 | 174/53 |
| 7,621,764 B2 * | 11/2009 | Shunjie | H01R 13/44 | 174/480 |
| 7,623,958 B1 * | 11/2009 | Laverick | B60R 11/0258 | 361/679.01 |
| 7,674,119 B1 * | 3/2010 | McCarthy | A47B 21/00 | 439/131 |
| 7,736,178 B2 * | 6/2010 | Byrne | G06F 1/266 | 439/527 |
| 7,771,216 B2 * | 8/2010 | Grems | H01R 13/60 | 439/131 |
| 7,793,597 B2 * | 9/2010 | Bart | A47B 31/06 | 108/44 |
| 7,900,988 B2 * | 3/2011 | Ryu | B60R 11/0235 | 224/483 |
| 7,952,865 B2 * | 5/2011 | Bao | G06F 1/181 | 361/679.4 |
| 7,999,419 B2 * | 8/2011 | Drane | H01H 3/161 | 307/326 |
| 8,007,295 B2 * | 8/2011 | Lin | A47B 21/06 | 439/131 |
| 8,021,172 B2 * | 9/2011 | Shunjie | H01R 13/44 | 174/480 |
| 8,097,805 B2 * | 1/2012 | Drane | H02G 3/12 | 174/50 |
| 8,104,816 B2 * | 1/2012 | Lupton, III | B60R 7/06 | 296/24.34 |
| 8,172,293 B2 * | 5/2012 | Lota | B60R 11/02 | 224/483 |
| 8,172,604 B2 * | 5/2012 | Byrne | A47B 21/06 | 439/131 |
| 8,196,985 B2 * | 6/2012 | Penner | B60R 7/04 | 296/24.34 |
| 8,256,814 B2 * | 9/2012 | Thorsell | B60R 7/04 | 296/24.34 |
| 8,287,292 B2 * | 10/2012 | Byrne | H02G 3/185 | 439/131 |
| 8,295,036 B2 * | 10/2012 | Byrne | H01R 25/003 | 174/57 |
| 8,482,252 B2 * | 7/2013 | Byrne | G11B 33/122 | 320/113 |
| 8,517,447 B2 * | 8/2013 | Biggs | B60R 7/04 | 296/24.34 |
| 8,528,956 B1 * | 9/2013 | Winiger | B60R 7/04 | 296/24.34 |
| 8,556,320 B2 * | 10/2013 | Yamagishi | B60R 7/04 | 296/24.34 |
| 8,563,883 B1 * | 10/2013 | Flegel | H02B 1/48 | 200/50.02 |
| 8,598,453 B2 * | 12/2013 | Hsiao | H02G 3/185 | 174/481 |
| 8,624,547 B2 * | 1/2014 | Thorsell | B60N 3/002 | 320/107 |
| 8,646,825 B2 * | 2/2014 | Minelli | B60R 7/082 | 296/37.7 |
| 8,668,258 B2 * | 3/2014 | Uwague-Igharo | B60N 2/4686 | 224/275 |
| 8,690,590 B2 * | 4/2014 | Byrne | H05K 5/03 | 439/131 |
| 8,714,613 B1 * | 5/2014 | Gillis | B60R 7/04 | 296/24.34 |
| 8,727,413 B2 * | 5/2014 | Seiller | B60R 11/00 | 296/24.34 |
| 8,772,649 B1 * | 7/2014 | Gretz | H02G 3/123 | 174/480 |
| 8,814,243 B2 * | 8/2014 | Kumblekere | B60R 16/0215 | 296/24.34 |
| 8,853,534 B2 * | 10/2014 | Wang | H05K 5/03 | 174/66 |
| 8,910,990 B1 * | 12/2014 | Oldani | B60R 11/02 | 220/260 |
| 8,939,491 B2 * | 1/2015 | Gillis | B60R 7/04 | 296/24.34 |
| 8,951,054 B2 * | 2/2015 | Byrne | H01R 13/447 | 307/104 |
| 8,979,163 B2 * | 3/2015 | Heil | B60R 11/02 | 296/24.34 |
| 8,986,022 B2 * | 3/2015 | Dinh | H01R 13/5213 | 439/131 |
| 8,993,891 B2 * | 3/2015 | Drane | H05K 5/0239 | 16/2.1 |
| 9,016,752 B2 * | 4/2015 | Myers et al. | B60R 7/06 | 296/24.34 |
| 9,054,476 B1 * | 6/2015 | Reynolds; Jason L. | H01R 39/64 | |
| 9,071,002 B2 * | 6/2015 | Mazzullo | H01R 13/516 | |
| 9,089,209 B2 * | 7/2015 | Matthai et al. | A47B 21/0314 | |
| 2002/0021551 A1 * | 2/2002 | Kashiwagi | G06F 1/16 | 361/679.57 |
| 2002/0135194 A1 * | 9/2002 | Schwarz | B60R 7/04 | 296/37.8 |
| 2004/0026947 A1 * | 2/2004 | Kitano | B60R 7/04 | 296/24.34 |
| 2004/0075373 A1 * | 4/2004 | Gershfeld | A47B 21/0073 | 312/223.3 |
| 2004/0147147 A1 * | 7/2004 | Griepentrog | H01R 13/447 | 439/131 |

(56) References Cited

U.S. PATENT DOCUMENTS

| | | | |
|---|---|---|---|
| 2005/0014408 A1* | 1/2005 | Swiatek | B62J 99/00 439/215 |
| 2006/0022478 A1* | 2/2006 | DeLong | B60N 2/468 296/37.8 |
| 2006/0085940 A1* | 4/2006 | Chernoff | A47L 5/24 15/313 |
| 2006/0178028 A1* | 8/2006 | Swiatek | H01R 24/58 439/215 |
| 2007/0124895 A1* | 6/2007 | Brown | A47B 96/00 24/16 PB |
| 2007/0138822 A1* | 6/2007 | Feit | B60K 35/00 296/70 |
| 2007/0176449 A1* | 8/2007 | Kukucka | B60N 2/4646 296/24.34 |
| 2007/0230099 A1* | 10/2007 | Turner | G06F 1/1632 361/679.55 |
| 2008/0032528 A1* | 2/2008 | Lai | H01R 13/512 439/131 |
| 2008/0053340 A1* | 3/2008 | Comeaux | A47B 21/03 108/44 |
| 2008/0079279 A1 | 4/2008 | Spykerman et al. | |
| 2008/0200050 A1* | 8/2008 | Byrne | H02G 3/185 439/131 |
| 2009/0058120 A1* | 3/2009 | Ioka | B60H 1/0055 296/24.34 |
| 2009/0142947 A1* | 6/2009 | Byrne | G06F 1/266 439/131 |
| 2010/0078954 A1* | 4/2010 | Liu | B60N 2/4686 296/24.34 |
| 2010/0124849 A1* | 5/2010 | Winstanley | H01R 13/44 439/620.21 |
| 2011/0095724 A1* | 4/2011 | Byrne | G11B 33/122 320/115 |
| 2011/0117760 A1* | 5/2011 | Winstanley | H01R 13/701 439/136 |
| 2011/0156418 A1* | 6/2011 | Thorsell | B60R 7/04 296/24.34 |
| 2011/0177714 A1* | 7/2011 | Byrne | H02G 3/185 439/535 |
| 2011/0240363 A1* | 10/2011 | Dinh | H02G 3/088 174/551 |
| 2012/0061983 A1* | 3/2012 | Seiller | B60R 11/00 296/24.34 |
| 2013/0057011 A1* | 3/2013 | Yamagishi | B60R 7/04 296/24.34 |
| 2013/0258604 A1* | 10/2013 | Quijano | B60R 7/04 361/725 |

* cited by examiner

VEHICLE ELECTRONIC CONNECTOR HUB

FIELD OF THE INVENTION

The present invention generally relates to a console assembly for use within a vehicle interior, and more particularly, to a console assembly having a rotatable electronic connector hub that provides accessibility to the electronic connector hub from multiple locations.

BACKGROUND OF THE INVENTION

As automotive interior styling progresses, there has been an increased desire for unique and stylish solutions for console assemblies while providing a sufficient amount of electronic ports for vehicle occupants. These electronic ports, however, are not usually aesthetically pleasing to the vehicle occupant. Accordingly, the electronic ports, in some instances, are concealed within compartments inside a vehicle cabin making the electronic port only accessible to certain vehicle occupants located within very specific locations.

SUMMARY OF THE INVENTION

According to one aspect of the present disclosure, an electronic connector hub includes a vehicle compartment. The electronic connector hub further includes a member that is mounted to a wall of the compartment and configured to rotate about an axis between a first position and a second position. A port is disposed on the member and accessible from within the compartment when the member is in the first position and accessible from outside the compartment when the member is rotated to the second position.

According to another aspect of the present disclosure, an electronic connector hub for a vehicle includes a rotatable member mounted to an interior panel. The member includes a first side that substantially matches a contour of the interior panel. The member is configured to rotate about an axis between a first position and a second position. A port is disposed on a second side of the member, wherein the port is accessible from within a compartment below the compartment opening when the member is in the first position and is accessible above the compartment opening when the member is in the second position.

According to another aspect of the present disclosure, an electronic connector hub for a vehicle includes a rotatable member mounted to an interior panel of a vehicle, wherein the member rotates about an axis between a first and a second position. Two ports are disposed on the member that are accessible from a first side of the interior panel when the member is in the first position, accessible from a second side of the interior panel when the member is in the second position, and accessible from both the first and second sides of the panel simultaneously if the member is at an intermediate position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
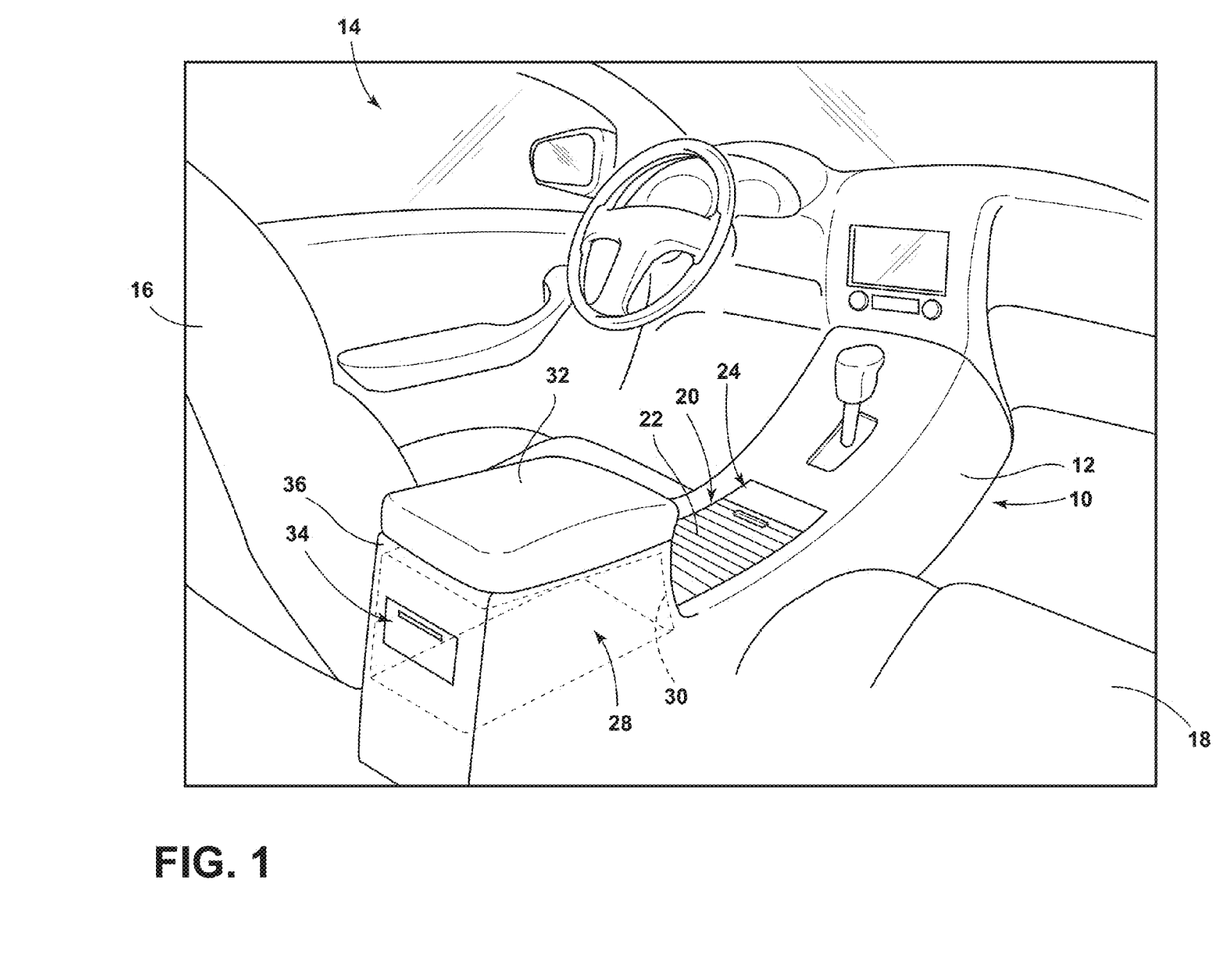
FIG. 1 is a rear perspective view of a vehicle passenger compartment having a console assembly according to an embodiment.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, reference numeral 10 generally designates a console assembly having an outer casing or housing 12. As shown in FIG. 1, the console assembly 10 is in the form of a center console assembly, which is configured to be disposed within a vehicle passenger compartment interior 14, generally between the driver 16 and front passenger seats 18. While a console assembly 10 is illustrated in one embodiment, it is contemplated that any vehicle interior panel may form the compartment according to other embodiments. The console assembly 10 includes a front console compartment 20 having sidewalls and a movable top cover 22, which is shown in FIG. 1 in a closed position. The front console compartment cover 22 can be slid on the console housing 12 to an open position, thereby providing top side access to the front console compartment 20. A front electronic connector hub 24 is located at the forward end of the front console compartment 20 and the front console compartment cover 22 abuts the front electrical connector hub 24 when the front console compartment cover 22 is in the closed position. The front electronic connector hub 24 is rotatable between a first position, wherein a front electronic port 26 (FIG. 2) is accessible from within the front console compartment 20, and a second position, wherein the front electronic port 26 (FIG. 2) is accessible external the front console compartment 20. The front electronic connector hub 24 may also be rotatable to intermediate positions wherein the front electronic connector hub 24 is accessible within the front console compartment 20 and external to the front console compartment 20 simultaneously when more than one front electronic ports 26 (FIG. 2) are disposed on the front electronic connector hub 24. As shown in FIG. 1, the front console compartment 20 is in the form of a storage compartment or bin adapted to store or place various items therein.

Still referring to FIG. 1, the console assembly 10 further includes a rear console compartment 28 having a housing or bin compartment 30 having side walls and a top side console compartment cover 32. A rear electronic connector hub 34 is disposed within a rear wall 36 of the console assembly housing 12, according to one embodiment. According to other embodiments, the connector hub 34 may be mounted onto other walls such as the front vertical wall of the console assembly housing 12 and may utilize a feature such as a cup holder as a repository for the device connected to the hub. The rear electronic connector hub 34 is rotatable between a first inward position, wherein a rear electronic port 38 (FIG. 2) is accessible from within the rear console compartment 28, and a second outward position, wherein the rear electronic port 38 (FIG. 3) is exposed and accessible external the rear console compartment 28. The rear electronic connector hub 34 may also be rotatable to intermediate third positions wherein a first rear electronic port 38 (FIG. 3) is accessible within the rear compartment 28 and a second electronic port 38 is accessible external the rear compartment 28, simultaneously. As shown in FIG. 1, the rear compartment 28 is in the form of a storage compartment or bin adapted to store or place various items therein.

Figure 2:
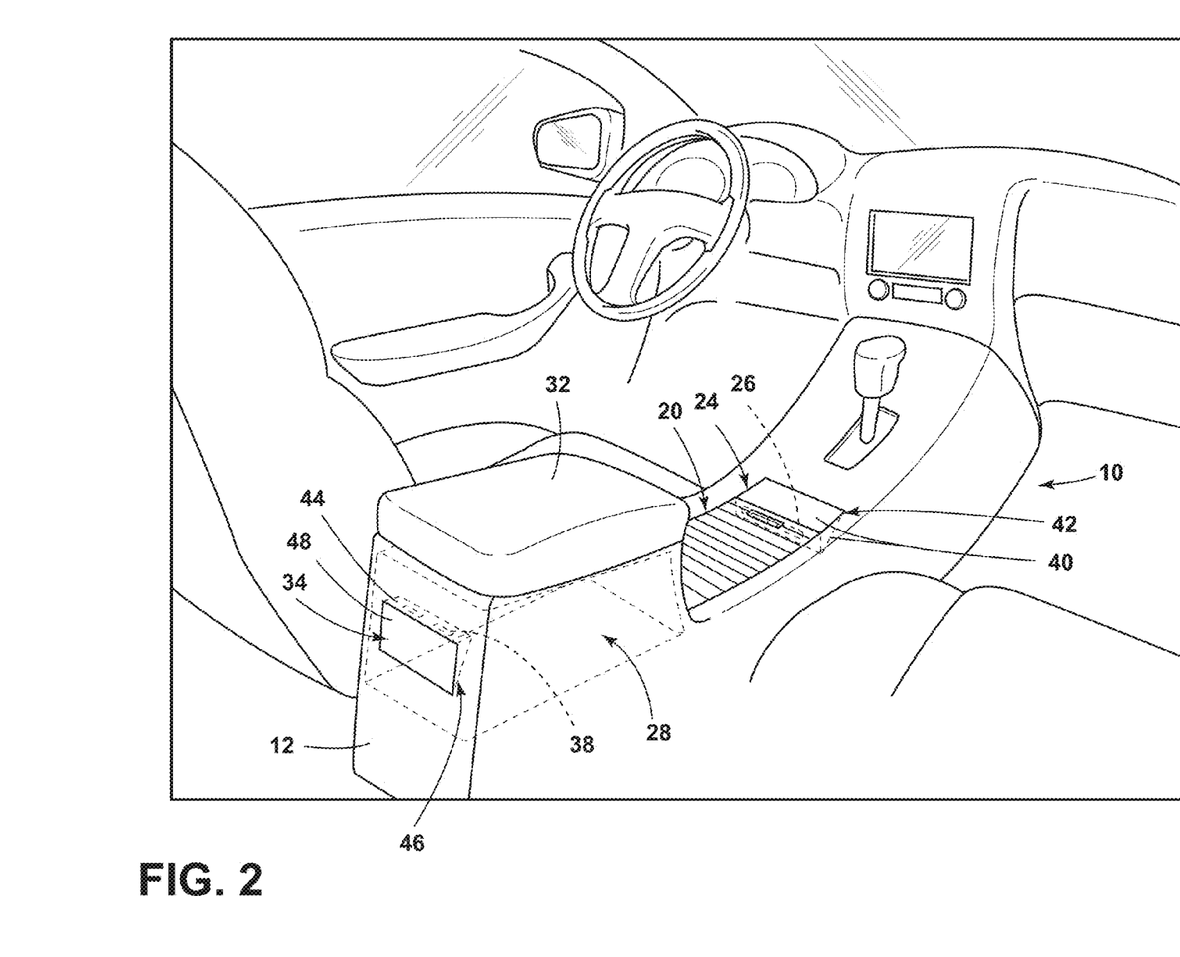
FIG. 2 is a rear perspective view of the passenger compartment and console assembly of FIG. 1 having an electronic connector hub on a rear wall of the console assembly and in a first inward position.

Referring to FIG. 2, the front electronic connector hub 24 and rear electronic connector hub 34 are each shown, respectively, in a first position. In the illustrated embodiment, the front electronic connector hub 24 includes a member 40 defined by a plurality of surfaces, a front electronic port 26, and a rotational axis 42 about which the front electronic connector hub rotates. Similarly, the rear electronic connector hub 34 includes a member 44 defined by a plurality of surfaces, a rear electronic port 38, and a rotational axis 46 about which the rear electronic connector hub 34 rotates. The rotational axis 46 may be defined by one or more pivot pins or other pivotal structure. The plurality of surfaces that define the front and rear electronic connector hub members 40, 44 may be formed from any desirable material, including but not limited to, a plastic material such as Acrylonitrile-butadiene-styrene (ABS), polypropylene (PP), thermoplastic olefin (TPO), stryrene block co-polymer (SEBS), thermoplastic polyurethane (TPU), polyethylene terepthalate (PET), or the like. As shown in FIG. 2, the front electronic port 26 on the front electronic connector hub 24 faces the forward end of the front console compartment 20 such that the front electrical connector hub 24 may further act as a wall of the front console compartment 20. While in the first position, the front electronic connector hub 24 is accessible from within the front console compartment 20.

Still referring to FIG. 2, a rear electronic port 38 on the rear electronic connector hub 34 is accessible from within the rear console compartment 28 while the rear electronic connector hub 34 is in a first inward position. Thus, while in the first inward position, a vehicle occupant may open the rear console compartment top cover 32 and access the rear electronic connector hub 34 from within the rear console compartment 28. When the rear electronic connector hub 34 is in the first inward position, the rearward facing surface 48 of the rear member 44 is flush with and substantially matches the contour of the surrounding rear surface 36 of the console assembly housing 12.

Figure 3:
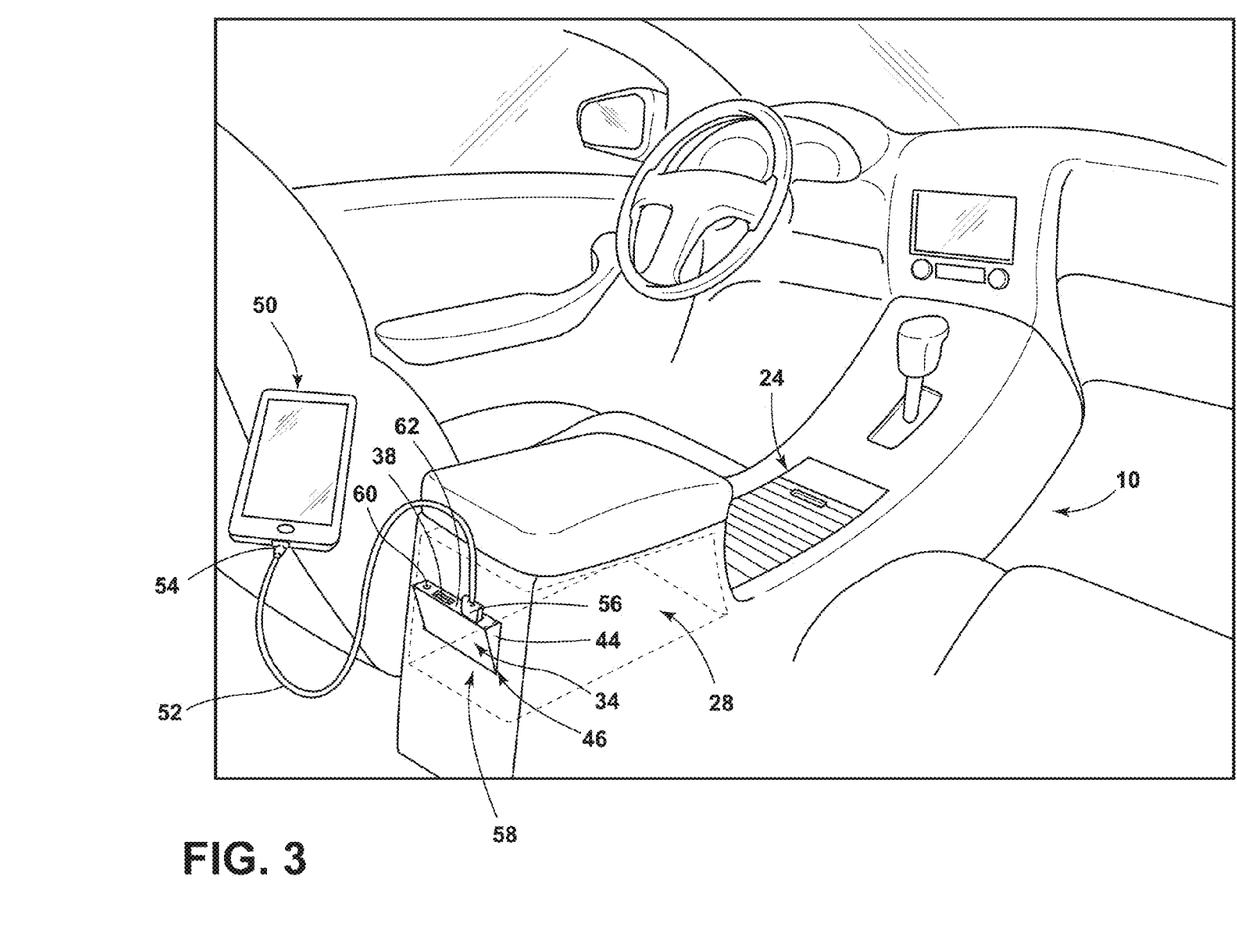
FIG. 3 is a rear perspective view of the passenger compartment and console assembly of FIG. 1 with the electronic connector hub in a second outward position.

Referring to FIG. 3, the rear electronic connector hub 34 is shown in a second outward position thereby making the rear electronic connector hub 34 accessible external to the rear console compartment 28. The rear electronic port 38 on the rear electronic connector hub 34 may comprise one or more of a power source connector or port for powering an electronic device 50, or may comprise a port, such as a universal serial bus (USB) port or audio jack, for integrating the electronic device 50 into the vehicle's electronic components. As shown in FIG. 3, an electronic cord 52 couples to an electronic device 50 by joining an electrical device connector 54 on a first end of the electronic cord 52 to the electronic device 50 and connecting a corresponding connector 56 of a second end of the electronic cord 52 to a rear electronic port 38 by inserting the corresponding connector 56 of an electronic cord 52 into the electronic port 38. With this configuration, the electronic device 50 may be powered or charged by the vehicle battery supply, the electronic device 50 and vehicle electronic system may communicate or transfer data, or any other desired electronic data or power action may be performed when the electronic device 50 is connected and paired to the vehicle.

Still referring to FIG. 3, the rear electronic connector hub 34 may be of any practicable shape and is movably secured, for example pivotally, to the console assembly 10 for moving the rear electronic connector hub 34 between the plurality of positions. In the illustrated embodiment, the rear electronic connector hub 34 is pivotally connected to the console assembly 10 about axis of rotation 46 located adjacent to a bottom portion 58 of the rear connector member 44. The rear electronic connector hub 34 may also contain additional passenger features and controls 60 including, but not limited to, passenger climate control, audio control buttons, or rear vehicle occupant heated seats. The rear electronic connector hub 34 is tilted outward about a horizontal axis of rotation 46 from a first inward position, shown in phantom in FIG. 2, to a second outward position through a tilt angle to provide accessibility to rear electronic port 38 located on an upward facing surface 62 of the rear connector member 44 external to the rear console compartment 28, as shown in FIG. 3. The tilt angle may be a function of the area necessary on an upward facing surface 62 of the rear connector member 44 for the rear electronic ports 38, any additional passenger features and controls 60, and the accessibility to the components on the upward facing surface 62. It is fully contemplated that the tilt angle can vary as long as the upward facing surface 62 of the rear connector member 44 accommodates any electronic ports 38 and passenger controls 60 to be included on the upward facing surface 62 of the rear connector member 44. The range of angle of the rear electronic connector hub 34 about a horizontal axis of rotation 46, in the illustrated embodiment, to the second outward position is around 30 degrees. The range of rotation, however, can be of any practicable amount that would allow for proper usage of the rear electronic connector 34. It is understood that FIG. 2 is merely illustrative of one pivot mechanism. Further, it is also contemplated that the rear electronic ports 38 and passenger controls 60 may be positioned on multiple surfaces of the rear connector member 44.

Figure 4:
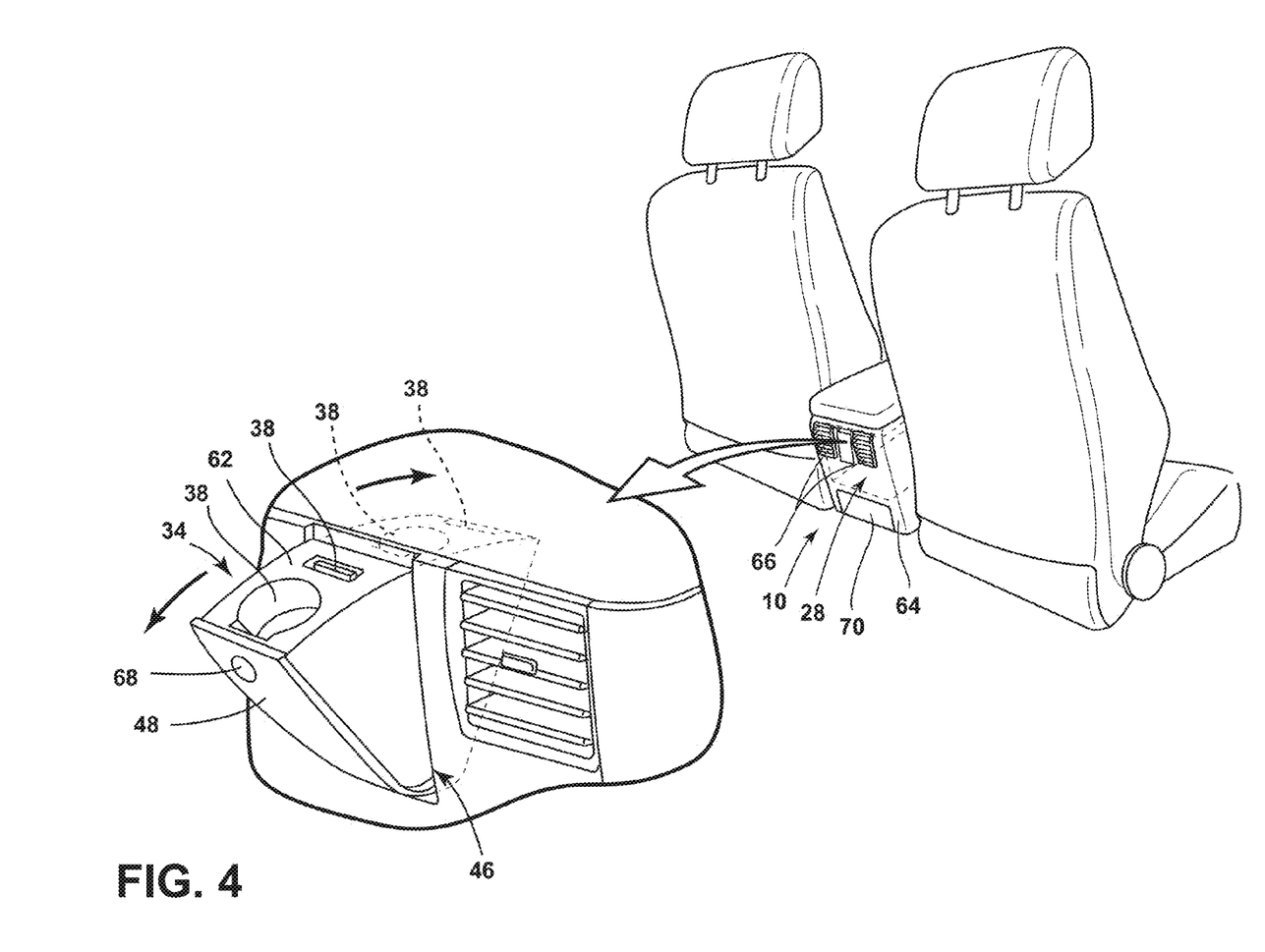
FIG. 4 is an enlarged rear perspective view of a console assembly with the electronic connector hub in an intermediate position.

Referring to FIG. 4, an additional embodiment of the rear electronic connector hub 34 is shown in a deployed outward position (solid lines) and a non-deployed inward position (dashed lines). The rear electronic connector hub 34 is partially rotated about a rotation axis 46 so that the rear electronic connector hub 34 is simultaneously accessible from within the rear compartment 28 and behind the console assembly 10. The rear electronic connector hub 34 has multiple electronic ports 38 disposed within a surface of the member 44 such that a plurality of electronic devices 50 (FIG. 3) may be charged concurrently. The rear electronic connector hub 34 may also include different electronic port types to accommodate the connection of a wide range of electronic devices 50 (FIG. 3). In the illustrated embodiment, the rear electronic connector hub 34 is integrated into the back panel 64 of the console assembly 10 between two air vehicle heating, ventilation, and air conditioning (HVAC) vents 66. The rear electronic connector hub 34 further includes a protrusion 68 for aiding the vehicle occupant in moving the rear electronic connector hub 34 to a plurality of available positions. While a protrusion 68 is shown in FIG. 4, it is contemplated that any type of vehicle occupant aiding mechanism may be used to assist in moving the electronic connector hub 24 (FIG. 1), 34 from one position to another.

Still referring to FIG. 4, the console assembly 10 may further include a rear assembly 70 also integrated into the back panel 64 of the console assembly 10 that is independent from the rear electronic connector hub 34. In the illustrated embodiment, the rear assembly 70 is located below the rear electronic connector hub 34. The rear assembly 70 may include cup holders, a storage area, or additional electronic ports designated for use by the vehicle occupants sitting behind the console assembly 10. When pivoted to the open position, the rear assembly 70 may expose cup holders, a storage area, or additional electronic ports.

Figure 5A:
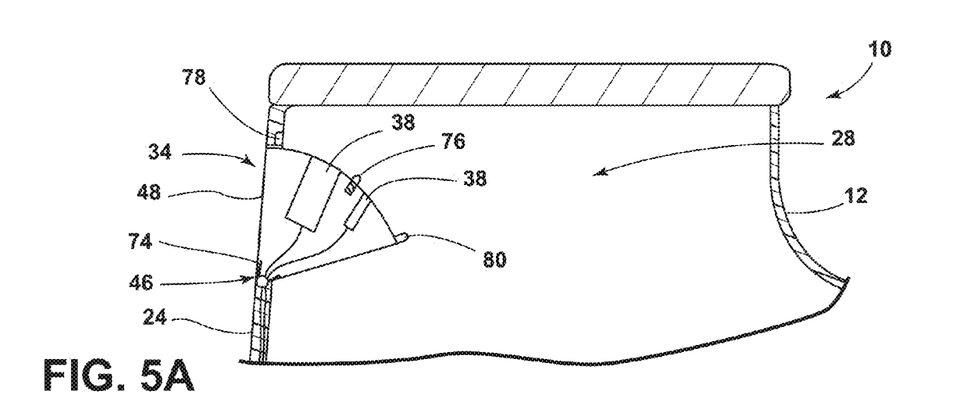
FIG. 5A is an exemplary cross-sectional view of the console assembly of FIG. 4 showing the electronic connector hub in an inward position.

Referring to FIG. 5A, the rear electronic connector hub 34 is illustrated in the first inward position, thus, the plurality of rear electronic ports 38 are accessible from within the rear compartment 28 and the rear facing surface of the member 48 substantially matches the contour of the rear surface 36 of the console assembly 10. In the illustrated embodiment, the rear electronic connector hub 34 is spring biased 74 towards the first position so that the first inward position is a default position, however, the rear electronic connector hub 34 may be biased towards any direction. The rear electronic connector hub 34 may be biased by any suitable biasing mechanism. The non-biased positions may be maintained through any means known in the art, including a latch, such as a detent 76 or a stop 80. As such, a latch may be added to, or formed with, the rear electronic connector hub 34 to limit unintended movement of the rear electronic connector hub 34 between a plurality of positions. It is also contemplated that the rear electronic connector hub 34 is movably mounted such that rotation of the rear electronic connector hub 34 to its first position is damped to slow the rotational velocity of the rear electronic connector hub 34. This damped motion can substantially impede the slamming of the rear electronic connector hub 34 against the console assembly housing 12. Also, the rear electronic connector hub 34 or the console assembly housing 12 may include features such as recesses or protrusions for accommodating the biasing member 74 or a damper assembly.

Figure 5B:
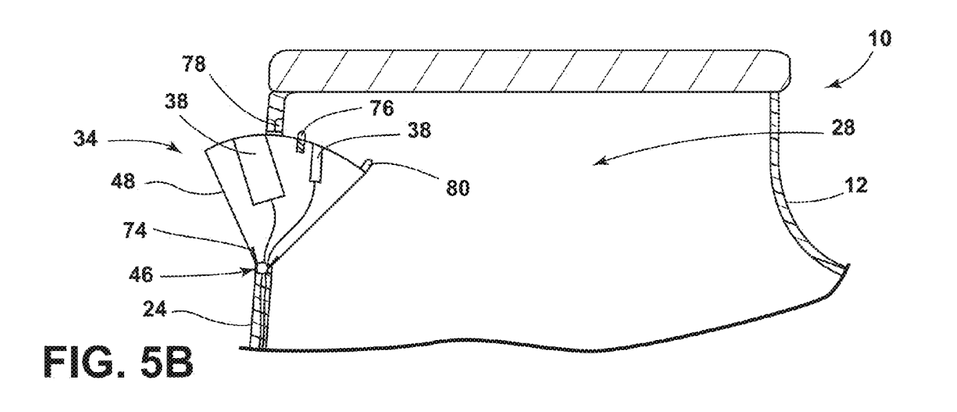
FIG. 5B is an exemplary cross-sectional view of the console assembly of FIG. 4 showing the electronic connector hub in an intermediate position.

Referring to FIG. 5B, the rear electronic connector hub 34 is shown approaching an intermediate position wherein the plurality of rear electronic ports 38 on the rear electronic connector hub 34 are accessible from within the rear compartment 28 and from an external rear side of the console assembly 10 simultaneously. Once the rear electronic connector hub 34 reaches the intermediate position, it is possible to connect a first electronic device 50 (FIG. 3) to the rear electronic connector hub 34 from within the rear compartment 28 while a second electronic device 50 (FIG. 3) is connected to the rear electronic connector hub 34 from a location that is external to the rear compartment 28. The rear electronic connector hub 34, in the illustrated embodiment, is rotated to the intermediate position about a rotation axis 46, which may be defined by one or more pivot pins. Further, a detent button 76 on the upper surface 62 of the rear member 44 engages with a corresponding detent pocket 78 formed in the console assembly 10 to form a latch that retains the rear electronic connector hub 34 in the intermediate position. The detent button 76 is elastically movable to maintain the rear electronic connector hub 34 in the intermediate position if desired, but the detent button 76 is compressible to rotate the rear electronic connector hub 34 to a different position. It is further contemplated that any other practicable position maintaining assembly may be utilized.

Figure 5C:
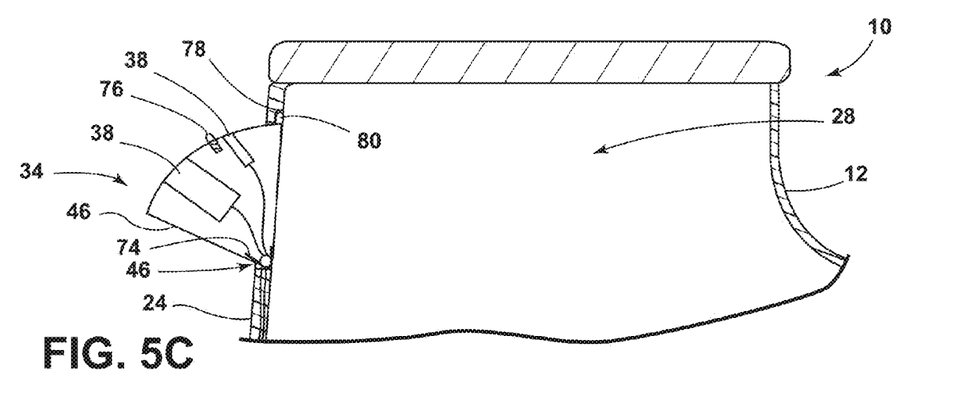
FIG. 5C is an exemplary cross-sectional view of the console assembly of FIG. 4 showing the electronic connector hub in an outward position.

Referring to FIG. 5C, the rear electronic connector hub 34 is rotated to a second outward position wherein the plurality of electronic ports 38 located on the rear electronic connector hub 34 are accessible from a position external the rear compartment 28. The rear electronic connector hub 34 rotates to the second outward position about rear rotation axis 46 and may include a stop 80, such as a non-compressible detent, to limit further rotation beyond the second position. The stop 80, or any other form of latch, may be of the same shape as the detent button and engage with the corresponding detent pocket 78 in the console assembly 10. The stop 80 may alternatively be any practicable mechanism that maintains the rotation angle of the rear electronic connector hub 34 at the second position but still allows for the rear electronic connector hub 34 to break away from the console assembly 10 to prevent part breakage when a large amount of force is applied to the rear electronic connector hub 34.

Figure 6:
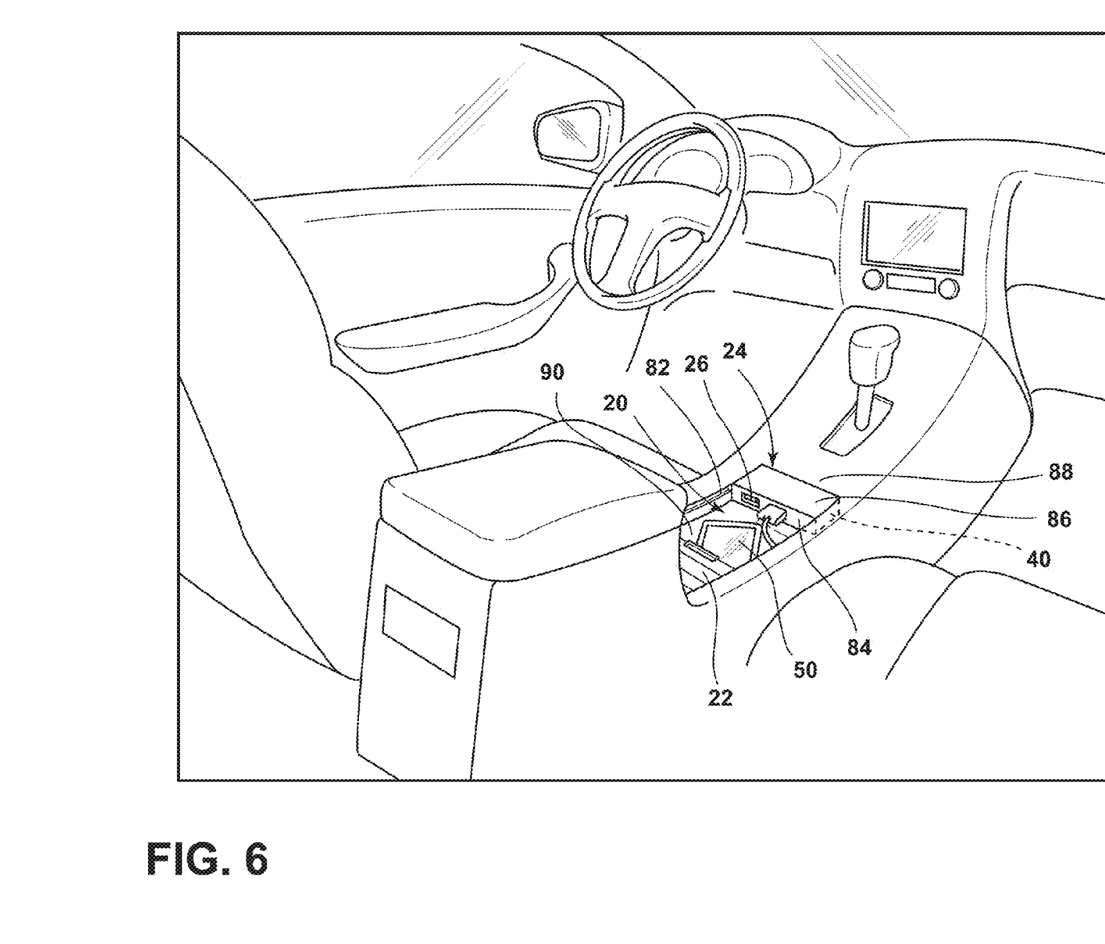
FIG. 6 is a rear perspective view of a vehicle passenger compartment and console assembly having an electronic connector hub in a front top portion of the console assembly and in a first inward position.

Referring to FIG. 6, the front electronic connector hub 24 is shown in a first inward position, wherein the front electronic port 26 is accessible within the front console compartment 20 below the front console compartment opening 82. In the illustrated embodiment, the front electronic connector hub 24 abuts the front console compartment 20 such that a rear-facing surface 84 of the front member 40 defines a front wall of the front console compartment 20. The front console compartment 20 may have a front console compartment top cover 22, which is shown in the open position in FIG. 6 and slides forward to cover the front console compartment 20. Although shown abutting the front end of the front console compartment 20, it is contemplated that the front electronic media connector hub 24 can be integrated into any side of a vehicle compartment. The upper surface 86 of the front electronic connector hub 24 may have a surface contour that substantially matches that of the console assembly panel 88 that surrounds the front electronic connector hub 24. The front electronic connector hub 24 is shown in FIG. 6 having a plurality of electronic ports 26. The front electronic ports 26, as illustrated in FIG. 6, are aligned horizontally adjacent to one another. However, it is contemplated that the front electronic ports 26 may alternatively be aligned vertically such that a first electronic device 50 may be charged from within the front console compartment 20 concurrently with a second electronic device 50 that is charged externally from the front console compartment 20 when in the second outward position, as shown in FIG. 7.

Figure 7:
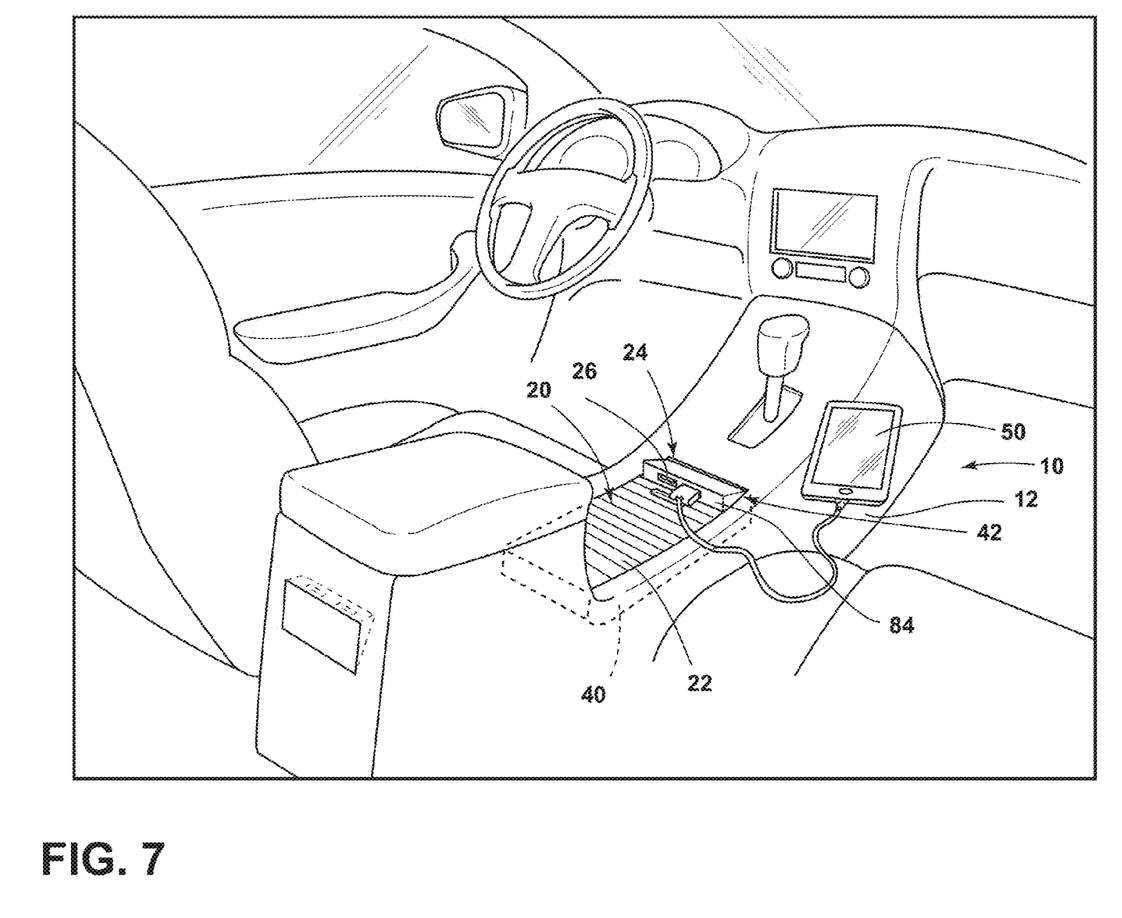
FIG. 7 is a rear perspective view of the console assembly of FIG. 6 having the electronic connector hub in a second outward position.

Referring to FIG. 7, the front electrical connector hub 24 in a second outward position is illustrated, wherein a vehicle occupant may access a front electronic port 26 and connect an electronic device 50 external to the front console compartment 20. The front electronic connector hub 24 is rotated to the second position about rotation axis 42. The front electronic connector hub 24 may rotate about the rotation axis 42 through the use of a pivot point, articulation, or any other practicable means. The front electronic connector hub 24 may have a single port 26 or a plurality of ports 26 for connecting a plurality of electronic devices 50 to the front electronic connector hub 24 simultaneously.

Still referring to FIG. 7, the rear-facing surface 84 of the front electronic connector hub 24 abuts the forward end of the front console compartment 20. The rear facing surface 84 may vertically extend below the bottom 90 (FIG. 6) of the front console compartment 20 when in the first inward position. Therefore, when the front electronic connector hub 24, of the illustrated embodiment, is rotated to the second outward position, the rear facing surface 84 of the front electronic connector hub 24 continues to define a front wall for the front console compartment 20. Providing a vertical wall for the front console compartment 20 while the front electronic connector hub 24 is rotated through a plurality of positions prevents articles within the front console compartment 20 from rolling under the front electronic connector hub 24. If the rear facing surface 84 extends vertically below the bottom 90 (FIG. 6) of the front compartment 20, it is possible for a front electronic port 26 to be in a non-usable position, below the front compartment bottom 90, when the front electronic connector hub 24 is in a first position and usable from within the front console compartment 20 when in a second position. The front electronic connector hub 24 may be biased towards the first position or second position. The opposing position may be maintained through any means known in the art, including a latch or a stop 80 (FIG. 5). As such, a latch may be added to, or formed with, the front electronic connector hub 24 to limit unintended movement of the front electronic connector hub 24 between different positions. Although not illustrated, the front electronic connector hub 24 may include additional features that effect the movement of the front electronic connector hub 24. For example, movement of the front electronic connector hub 24 may also be damped or enhanced by the inclusion of a spring, counterweight, motor, or the like. For ease of opening and closing of the front electronic connector hub 24, without necessitating the diversion of the driver's attention from the road, the front electronic connector hub 24 may further include a push-push latch, or any other practicable latch. A front electronic connector hub 24 provided with a push-push latch is opened by pushing on the top surface 86 of the front electronic connector hub 24, which is normally biased in an open direction, and closed by again pushing on the top surface 86 of the front electronic connector hub 24.

It is also important to note that the construction and arrangement of the elements of the disclosure as shown in the exemplary embodiments are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. An electronic connector hub for a vehicle comprising:
   a vehicle compartment;
   a member mounted to the compartment and configured to rotate about an axis between a first position, an intermediate position, and a second position;
   a latch configured to hold the member in the intermediate and second positions; and
   a port disposed on the member and accessible from within the compartment in the first position and from outside the compartment in the second position.

2. The electronic connector hub for a vehicle of claim 1, wherein the member contains first and second ports.

3. The electronic connector hub for a vehicle of claim 2, wherein the first port is accessible inside the compartment and the second port is accessible outside the compartment simultaneously when the member is rotated to an intermediate position between the first and second positions.

4. The electronic connector hub for a vehicle of claim 1, wherein the member rotates less than 45 degrees to move from the first position to the second position.

5. The electronic connector hub for a vehicle of claim 1, wherein the port is disposed in an upwardly position in the first and second positions.

6. The electronic connector hub for a vehicle of claim 1, wherein the member includes a stop defining the maximum rotation between the first and second positions, the stop configured to break away from the compartment to prevent part breakage when a sufficient amount is applied to the member.

7. The electronic connector hub for a vehicle of claim 1, wherein the member is biased to the second position.

8. The electronic connector hub for a vehicle of claim 1, wherein two ports are positioned adjacent to each other on a single side of the member.

9. The electronic connector hub for a vehicle of claim 1, wherein the latch includes a compressible detent to maintain the member in an intermediate position and a non-movable stop to maintain the member in the second position.

10. The electronic connector hub for a vehicle of claim 1, wherein the member has a substantially triangular cross section, wherein the port is on one surface thereof and the rotational axis is proximate to an intersection of the two surfaces that do not have the port thereon.

11. A vehicle electronic connector hub comprising:
    a movable member mounted to a compartment, the member having a first side substantially matching a compartment contour and a second side having first and second ports, wherein the first port is accessible within the compartment in a first position and accessible external to the compartment in a second position, and the second port is non-accessible in the first position and accessible within the compartment in the second position.

12. The vehicle electronic connector hub of claim 11, wherein the member further comprises:
a first port accessible from within the compartment and a second port accessible from outside the compartment simultaneously.

13. The vehicle electronic connector hub of claim 11, wherein a second interior panel abuts the second side of the member.

14. The vehicle electronic connector hub of claim 11, wherein the member is biased towards one of the first and second positions.

15. The vehicle electronic connector hub of claim 14, further comprising:
a latch to maintain the member in the other of the first and second positions.

16. A vehicle electronic connector hub comprising:
a rotatable member mounted to an interior panel, wherein the member rotates about an axis between a plurality of positions;
first and second ports disposed on the member, wherein the first and second ports are on the same side of a vehicle interior panel in a first position and simultaneously accessible on two different sides of the interior panel when rotated to an intermediate position; and
a latch on the member having a movable portion and a stationary portion.

17. The vehicle electronic connector hub of claim 16, further comprising:
a position maintaining assembly for holding the member in an intermediate position.

18. The vehicle electronic connector hub of claim 16, wherein the panel is configured as a back panel of a vehicle center console such that an occupant in a front row of the vehicle may access the member through the center console when the member is in the first position and an occupant may only access the member when the member is disposed in the intermediate or second position.

19. The vehicle electronic connector hub of claim 18, wherein the latch includes a detent button on an upper surface of the member that engages with a corresponding detent pocket formed in the compartment to retain the member in the intermediate position.

20. The vehicle electronic connector hub of claim 16, further comprising:
a dampener connected to the member and the interior panel.

* * * * *